Jan. 2, 1945.   R. D. AMSDEN   2,366,466
BATTERY CHARGER
Filed Dec. 17, 1943
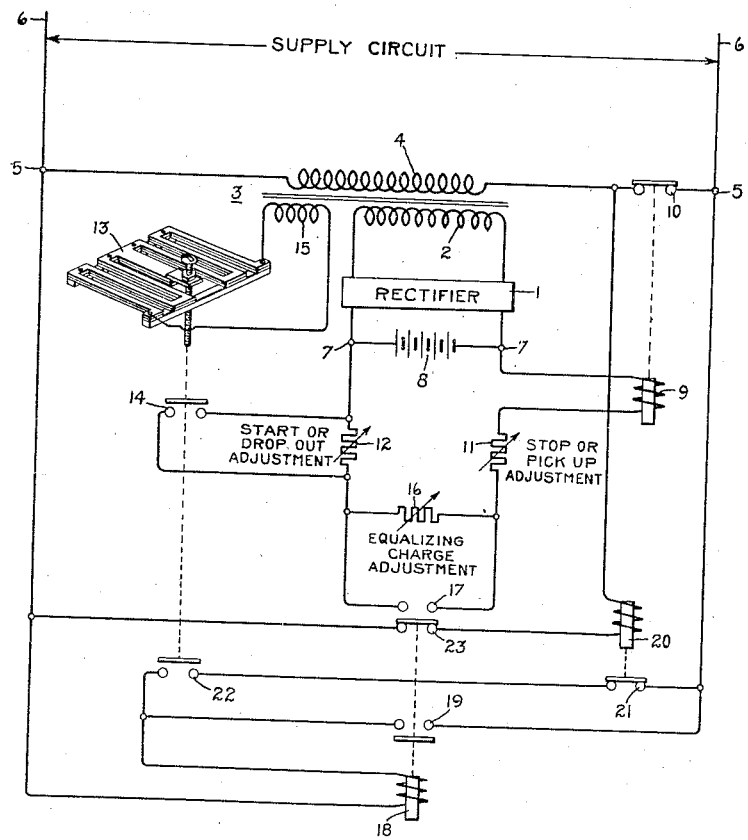
Inventor:
Ralph D. Amsden,
by Harry E. Dunham
His Attorney.

Patented Jan. 2, 1945

2,366,466

UNITED STATES PATENT OFFICE 2,366,466

BATTERY CHARGER

Ralph D. Amsden, Lynn, Mass., assignor to General Electric Company, a corporation of New York Application December 17, 1943, Serial No. 514,617

8 Claims. (Cl. 320—34)

This invention relates to battery chargers and more particularly to improvements in battery chargers which provide an equalizing charge for the battery.

When battery chargers are automatically controlled by a voltage relay which causes the battery to be charged up to a predetermined voltage and then allows it to be discharged down to a lower voltage whereupon the cycle is repeated over and over again the battery usually consists of a number of cells connected in series and the voltage relay responds to the sum of the voltages of the series-connected cells. However, these cells do not have identical characteristics so that their individual voltages are not equal. One reason for this is that the cells have different internal leakages. Therefore, although the battery voltage is periodically charged up to the same value the cells having lower than average internal leakage tend to become more and more nearly overcharged and the cells which have higher than average leakage tend to become more and more undercharged. In order to correct this tendency of the charger to allow the individual cells to get further and further apart in their state of charge it is desirable from time to time to put a so-called equalizing charge into the battery. This equalizing charge is achieved by charging the battery to a higher voltage than the voltage at which the charger normally terminates charging. In this manner the undercharged cells are brought up to full charge, whereas the more fully charged cells do not receive an objectionable overcharge.

In accordance with this invention there is provided a novel and simple automatic means for providing an equalizing charge.

An object of the invention is to provide a new and improved automatic battery charger.

Another object of the invention is to provide a battery charger with automatic means for giving the battery an equalizing charge.

The invention will be better understood from the following description taken in connection with the accompanying drawing and its scope will be pointed out in the appended claims.

Referring now to the single figure of the accompanying drawing there is illustrated therein diagrammatically an embodiment of the invention as applied to a rectifier type of battery charger. In this figure the rectifier is indicated schematically at 1. This rectifier has input terminals connected to the secondary winding 2 of a power supply transformer 3 whose primary winding 4 is arranged to be connected to a pair of input terminals 5 for the charger. These input terminals are adapted to be connected to any suitable alternating-current supply circuit 6. The rectifier 1 has output terminals 7 across which a storage battery 8 may be connected. The connections of the primary winding 4 to the input terminals 5 are controlled by a battery voltage relay having an operating coil 9 effectively connected across the output terminals 7. This voltage relay is provided with a set of contacts 10 so arranged that when the voltage relay is dropped out the contacts are closed and the transformer 3 is energized, whereas when the relay is picked-up the contacts are open and the transformer is de-energized. It will be obvious to those skilled in the art, however, that it is not necessary that the charge be terminated entirely when the relay picks up and any suitable impedance may be shunted across the contacts 10 so as to permit charging at reduced voltage and therefore at a reduced rate when the relay is picked up and the contacts 10 are open.

For controlling the stopping of charging, that is to say, for controlling the pick-up voltage of the relay, a rheostat 11 is connected in series with the winding 9, and for controlling the starting of charging or, in other words, for controlling the drop out voltage of the voltage relay, a rheostat 12 is connected in series with the winding 9. In addition to the rheostat 12, the means for controlling the starting or drop out adjustment of the relay comprises a drop out adjusting thermal relay in the form of an electrically heated bimetallic strip 13 for operating a set of contacts 14 connected across the starting rheostat 12. The heating current for the bimetallic element 13 is obtained from a tertiary winding 15 on the transformer 3.

For automatically providing the battery with an equalizing charge there is provided an equalizing charge adjusting rheostat 16 connected in series with the voltage relay coil 9. This rheostat is normally short circuited by a set of contacts 17 on a relay 18 which is effectively connected to respond to the input voltage of the charger through a set of seal-in contacts 19 thereon.

The relay 18 is caused to pick up after the equalizing charge has been put into the battery by means of a relay 20 which is connected across the input terminals 5 through the main control contacts 10 of the voltage relay. Relay 20 has a set of contacts 21 which close when it is deenergized by the opening of the contacts 10 due to the pick-up of the voltage relay and these contacts are connected across the seal-in contacts 19 of the relay 18 through a second set of contacts 22 on the thermal relay.

The thermal relay contacts are open when the relay is cool, that is to say, when it is deenergized, and they close when heating current flows through the thermal element 13 due to the energization of the main transformer 3 during charging of the battery.

In order to prevent unnecessary operation of the relay 20 after the relay 18 seals in, the latter is provided with a third set of contacts 23 which are in series with the relay 20 and which open its circuit whenever the relay 18 is sealed in.

The operation of the illustrated embodiment of the invention is as follows: The parts are all shown in the positions they occupy when the supply circuit is either deenergized or its voltage is too low to provide charging current for the battery and the battery voltage is below the dropout value of the voltage relay so that the contacts 10 are closed. If now the supply voltage returns to normal, charging will commence, relay 20 will pick up through the closed contacts 23 of the dropped-out relay 18, thus opening contacts 21, and in a short time the thermal element 13 will be heated sufficiently to cause closure of the contacts 14 and 22. However, closure of contacts 22 will not cause energization of the relay 18 because contacts 21 have already opened. The extra resistance of the rheostat 16 in circuit with the coil 9 of the voltage relay means that the pick-up voltage of this relay has been raised so that charging will continue until the battery voltage attains a relatively high value, at which point relay 9 will pick up and stop further charging by opening its contacts 10. This deenergizes relay 20 which immediately closes its contacts 21 before the thermal element 13 has had time to cool off and open the contacts 22 so that a circuit is now completed through the contacts 21 and 22 in series for energizing the relay 18 which picks up and seals in through the contacts 19, thereby closing the contacts 17 and short-circuiting the equalizing charge adjusting rheostat 16.

At the same time that the contacts 22 open, due to the cooling of the bimetal element 13, the contacts 14 of the thermal relay open, thereby adding the resistance of rheostat 12 to the circuit of the coil 9 of the voltage relay. This has the effect of reducing the current in the coil 9 so as to raise the drop-out voltage of the relay 9 to as close to the normal pick-up voltage as is desired. Consequently, when the battery voltage falls slightly the voltage relay will drop out, thereby closing its contacts 10 and restarting the charging operation. However, this time the contacts 23 are open so that relay 20 does not operate and contacts 17 are closed so that rheostat 16 is short-circuited with the result that the pick-up voltage of the voltage relay is controlled entirely by the rheostat 11 with the result that the pick-up voltage will be lower than it was when rheostat 16 was in the voltage coil circuit. The contacts 14 and 22 reclose, the contacts 14 staying closed throughout charging and having no effect on the pick-up voltage as they short-circuit the rheostat 12 throughout substantially the entire charging operation. When the voltage relay picks up the charging operation is terminated by the opening of the contacts 10 and the subsequent cooling of the thermal element 13 reopens the contacts 14 so as to reinsert the drop-out adjusting rheostat 12 in the voltage coil circuit. This cycle will then be repeated over and over again until failure of the voltage of the supply circuit will cause relay 18 to drop out and reinsert the rheostat 16 in series with the voltage relay coil 9 whereby the pick-up voltage of this relay is again raised so as to provide for an equalizing charge upon the return of the supply voltage to normal.

Adjusting of the rheostat 11 adjusts the voltage at which the relay 9 picks up or, in other words, adjusts the voltage at which charging is reduced or stopped. Adjusting the rheostat 12 controls the dropped-out voltage of the relay 9 and thus it controls the voltage at which charging is started or is increased to its high value. Adjusting of the rheostat 16 controls the equalizing charge in that it controls the voltage at which the equalizing charge is terminated.

It should be understood that the low supply voltage condition which resets the charger so as to provide an equalizing charge can be produced intentionally, as by momentarily disconnecting the charger from the supply circuit, as well as by an unintentional and accidental failure of charging voltage.

While there has been shown and described a particular embodiment of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to secure by Letters Patent of the United States is:

1. In combination, an automatic battery charger which holds the battery voltage between two values by alternately charging it and allowing it to discharge, and means responsive to failure of charging voltage for resetting said charger in such a manner that the battery will be charged to a predetermined higher voltage than the higher of said two values the first time it is charged after the restoration of charging voltage.

2. In combination, an automatic battery charger which holds the battery voltage between two values by alternately charging it and allowing it to discharge, means responsive to failure of charging voltage for resetting said charger in such a manner that upon restoration of charging voltage the battery will be charged to a predetermined higher voltage than the higher of said two values, and means operative when said predetermined high voltage is attained for restoring the original setting of said charger so that during subsequent charges the battery is charged only to the higher of said two voltage values.

3. In combination, an automatic battery charger which holds the battery voltage between two values by alternately charging it and allowing it to discharge, and automatic means responsive to a predetermined operating condition of said charger for changing the setting of said charger in such a manner that the battery will be charged to a predetermined higher voltage than the higher of said two values and then resetting it to terminate subsequent charges at the higher of said two values.

4. In combination, an automatic battery charger which holds the battery voltage between two values by alternately charging it and allowing it to discharge, and automatic means responsive to a predetermined abnormal electrical condition of said charger for changing the setting of said charger in such a manner that the battery will be charged to a predetermined higher voltage than the higher of said two values and then resetting it to terminate subsequent charges at the higher of said two values.

5. In combination, an automatic battery charger having a battery voltage relay for starting battery charging at a predetermined value of battery voltage and stopping battery charging at a predetermined higher value of battery voltage, means responsive to inadequate supply voltage to said charger for raising the voltage at which said relay will stop battery charging, and means responsive to stopping of charging at said raised voltage after said supply voltage returns to an adequate charging value for restoring the setting of said voltage relay to its original stopping voltage.

6. In combination, a supply circuit, a storage battery, a voltage relay connected in shunt circuit relation to said battery, said relay having predetermined pick-up and drop-out voltages, means responsive to the dropping out of said relay for interconnecting said battery and supply circuit in battery charging relation, said means being responsive to the picking-up of said relay for disconnecting said battery and supply circuit, means responsive to absence of adequate voltage of said supply circuit for battery charging for raising the pick-up voltage of said relay, and means responsive to subsequent picking-up of said relay at said raised value of voltage for restoring its pick-up voltage to its previous value.

7. An automatic battery charger comprising, in combination, input terminals for connection to a source of current supply, direct-current output terminals for connection to the storage battery to be charged, a voltage relay connected to be responsive to the voltage between said output terminals for controlling connections between said input and output terminals, auxiliary relay means responsive to absence of voltage between said input terminals for raising the pick-up voltage of said voltage relay, and means responsive to said voltage relay picking up for causing said auxiliary relay to restore the pick-up voltage of said voltage relay to its original value.

8. An automatic battery charger comprising, in combination, input terminals for connection to a source of current supply, direct-current output terminals for connection to the storage battery to be charged, a voltage relay connected to be responsive to the voltage between said output terminals for controlling connections between said input and output terminals, a resistor in series with said voltage relay, a normally sealed-in auxiliary relay effectively connected across said input terminals, said auxiliary relay having a set of contacts for short-circuiting said resistor, and means responsive to the picking up of said voltage relay for controlling an energizing circuit for said auxiliary relay.

RALPH D. AMSDEN.